United States Patent
Loe et al.

(10) Patent No.: US 6,898,829 B2
(45) Date of Patent: May 31, 2005

(54) COUPLING DEVICE

(75) Inventors: Ola Loe, Stavanger (NO); Jens C. Lindaas, Royksund (NO); Johannes H. Brodtkorb, Stavanger (NO)

(73) Assignees: Stolt Offshore AS, Stavanger (NO); Stolt Offshore Limited, Aberdeen (GB)

( * ) Notice: Subject to any disclaimer, the term of this patent is extended or adjusted under 35 U.S.C. 154(b) by 0 days.

(21) Appl. No.: 10/381,285
(22) PCT Filed: Sep. 17, 2001
(86) PCT No.: PCT/GB01/04129

§ 371 (c)(1),
(2), (4) Date: Sep. 4, 2003

(87) PCT Pub. No.: WO02/25123

PCT Pub. Date: Mar. 28, 2002

(65) Prior Publication Data

US 2004/0025309 A1 Feb. 12, 2004

(30) Foreign Application Priority Data

Sep. 19, 2000 (GB) .............................. 0022909

(51) Int. Cl.⁷ ................................................ F16B 45/02
(52) U.S. Cl. ..................................... 24/599.5; 24/600.1
(58) Field of Search ........................... 24/600.1, 599.5, 24/599.9, 600.2; 294/82.2, 82.33

(56) References Cited

U.S. PATENT DOCUMENTS

| | | | | |
|---|---|---|---|---|
| 70,750 A | * | 11/1867 | Sargent | 24/599.4 |
| 248,957 A | * | 11/1881 | Smith | 24/600.2 |
| 621,295 A | * | 3/1899 | Curtis | 294/82.2 |
| 679,088 A | * | 7/1901 | Methven | 24/600.1 |
| 1,521,811 A | * | 1/1925 | Hartbauer | 24/600.8 |
| 1,576,352 A | * | 3/1926 | Nordling | 24/600.1 |
| 1,626,866 A | * | 5/1927 | Neilson | 294/82.2 |
| 1,790,056 A | * | 1/1931 | Moody | 294/82.2 |
| 2,197,997 A | | 4/1940 | Dee | 24/241 |
| 2,705,357 A | * | 4/1955 | Davick | 294/82.2 |
| 2,706,318 A | * | 4/1955 | Coffing | 294/82.2 |
| 3,722,943 A | * | 3/1973 | Kalua, Jr. | 294/82.2 |
| 5,579,564 A | | 12/1996 | Rullo et al. | 24/599 |
| 5,735,025 A | | 4/1998 | Bailey | 24/600.1 |
| 5,896,630 A | | 4/1999 | Smith et al. | 24/600.1 |

FOREIGN PATENT DOCUMENTS

| | | | | |
|---|---|---|---|---|
| DE | 2425867 A | * | 12/1974 | B66C/1/36 |
| GB | 2020725 | | 11/1979 | |
| JP | 09-329126 | | 12/1997 | |
| JP | 2000205235 A | * | 7/2000 | F16B/45/02 |

* cited by examiner

Primary Examiner—James R. Brittain
(74) Attorney, Agent, or Firm—Sheridan Ross PC

(57) ABSTRACT

A coupling device enabling rapid connection and disconnection of lifting wires or similar articles for attachment by an ROV to/from a submerged object comprising a main body portion (1), a hook potion (2), a closing member operated by a member (5) and a separate safety latch (4) arranged to lock the closing member when closed such that a load cannot escape the hook portion, the latch member and closing member being further arranged such that a gripping action (A, B) on two opposite sides of the body portion will automatically release said latch member and move the closing member into the open configuration while the device is held bodily under said gripping action, the closing member and latch member being spring biased so as to close and then lock the hook automatically when the grip is released.

17 Claims, 2 Drawing Sheets

COUPLING DEVICE

The present invention relates to devices for connection and disconnection of, for example, lifting wires, and in particular a device to enable rapid connection and disconnection of lifting wires or similar articles for attachment by a ROV (Remotely Operated Vehicle) to/from a submerged object.

Today, to a large extent, modified standard lifting hooks for topside application are being used subsea. Unfortunately, standard hooks are not designed for the subsea environment, nor for being handled by manipulators on an ROV. It is desired that the hook or other device should be locked against accidentally becoming disengaged from its load, and yet be openable reliably and simply by a robot arm on the ROV.

In a first aspect of the invention, there is provided a coupling device adapted for remote manipulation, the device comprising a main body portion, a hook portion, and at least two movable members, the movable members including a closing member movable relative to the hook portion between open position and closed configurations, and at least one latch member arranged to lock said closing member in the closed configuration, the closed configuration being such that a load cannot escape said hook portion, the latch member and closing member being further arranged such that a gripping or squeezing action on two opposite sides of said body portion will automatically release said latch member and move said closing member into the open configuration while the device is held bodily under said gripping action, the closing member and latch member being spring biased so as to close and then lock the hook automatically when the grip is released.

The latch member and closing member may each be operated directly under said gripping action, or via respective movable operating members.

In a preferred embodiment, the closing member opens outwardly from the closed to the open position.

In a preferred embodiment, the closing member is operated indirectly via an operating member movable under said gripping action. The closing member takes the form of a lever pivotally connected to said body portion and having a projection upon which the operating member acts to open the device. The closing member may further be provided with a stepped cam profile for engaging with the latch member. The operating member may also be pivotally connected to the body portion of the device. In a compact arrangement, the closing member can be moved in this way through a relatively large angle, to provide best access to the mouth of the hook.

The latching member may also be in the form of a lever, directly operated under said gripping action.

A common spring or springs may be arranged to act directly or indirectly between the closing member and the latch member, so as to bias both of said parts into their closed and locked positions. Where a separate operating member is provided for the closing member, the springs(s) may be arranged to act between the operating member and the latch member.

The movable members may be substantially shrouded within the main body portion of the device so as to prevent accidental release by impact other than said gripping action on said two sides of the body portion. In particular, when the device is in its closed and locked configuration the movable members may be flush with the extremities of the main body when viewed transversely to the gripping directions.

Movement of said movable members may be limited by stop formations such that at least one of them provides the means of holding the device bodily after the device enters its open configuration. Alternatively, the movable members may be arranged to yield until the gripping action is received on the body of the device.

The body portion and hook portion may be formed of a single piece of metal, or pieces welded together to form a unit. In the preferred embodiment, the movable members carry none of the load when the coupling device is used for example as a lifting hook. The body portion may include a recess which accommodates the moving members between two walls thereof.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Figures 1, 2:
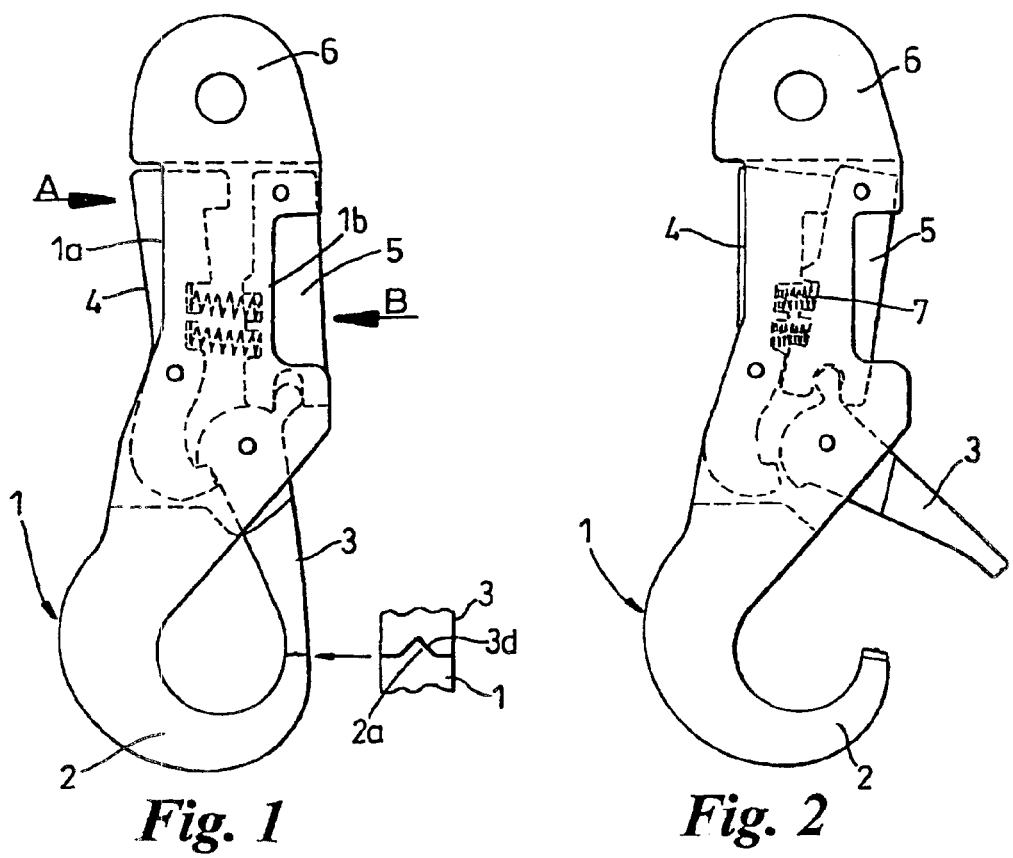
FIG. 1 shows schematically a hook device embodying the present invention, when in its closed and locked state, with side view detail inset.
FIG. 2 shows schematically the device in its open state.
Figure 6:
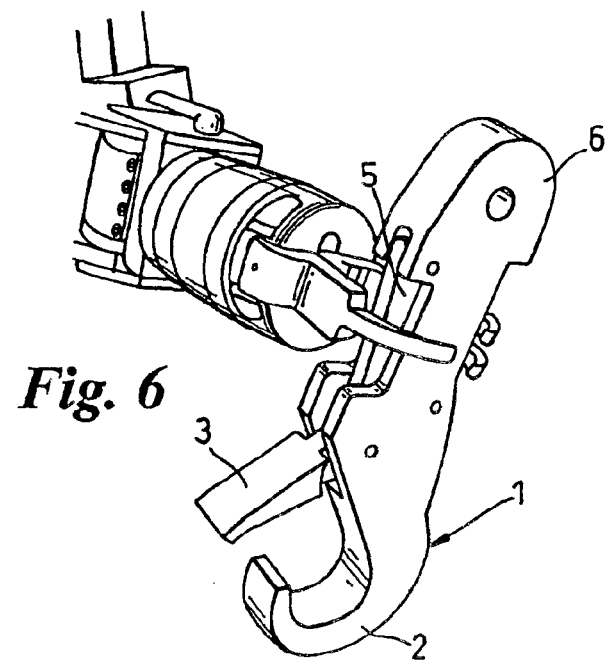
FIG. 6 illustrates manipulation of the device by a robot arm.

Referring now to FIGS. 1 and 2, there is shown schematically an embodiment of the novel coupling device in its locked and open states respectively. The body of the device is made up of a main member 1 which comprises a solid hook 2 at the bottom end and an eye 6 at the top for attaching, for example, lifting wires. The central section of the body is hollow from side-to side, between flat side pieces parallel to the plane of the drawing. This section houses a locking finger 3, a safety latch 4, and an operating lever 5. The main member 1 in this embodiment is machined from a single piece of steel. Alternatively, it may be formed by casting, and/or the ends and sides can be formed separately and joined by welding, for example.

Figure 3:
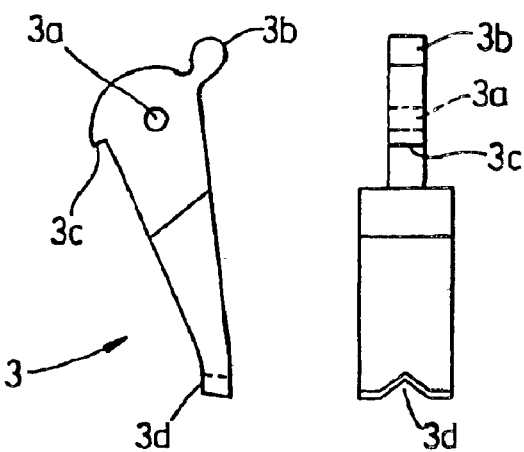
FIGS. 3 to 5 show in more detail a locking finger, a safety latch and an operating lever, respectively, in the same aspect as FIGS. 1 and 2, and in side elevation.

Locking finger 3 is shown in greater detail in FIG. 3, and serves as the closing member mentioned in the introduction. The locking finger 3 is tapered towards its bottom end. Near the top is a hole 3a for a pivot by which the part is held within the main member 1 and can rotate between open and closed positions shown in FIGS. 1 and 2 respectively. Adjacent to this pivot 3a, the side of member 3 inside the main member defines a cam profile including a catch 3c enabling it to be held against rotation in the closed position place by the safety latch 4. Protruding from the top of locking finger 3 is a knob 3c by which rotation or the locking member 3 can be effected by the operating lever 5. At the bottom end is a longitudinal groove 3d. This groove 3d engages a ridge 2a on the tip of hook 2, and has two tasks. It helps support the finger 3 if exposed to a sideways force and it reduces the risk of jamming of the masterlink between, or through the two parts.

Figure 4:
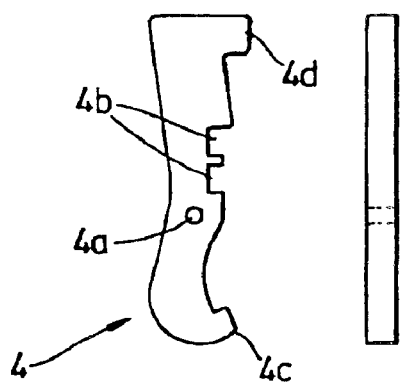

The safety latch 4 is shown in greater detail in FIG. 4. The latch 4 in this embodiment is mounted within the main member 1 on the opposite side to the operating lever 5. The sides of the body are indented at 1a, in such a way that a part of the latch 4 projects from its housing and can therefore be operated easily by an ROV applying force A. At the same time, viewed in profile latch 4 does not protrude beyond the outline of the main member 1, so as to be shielded against inadvertent operation. There is a pivot hole 4a located approximately one third of the way up the latch 4, for pivotal mounting in the main member 1. Positioned just above this on the edge of the latch inside the main member are two notches 4b for receiving the ends of two coil springs 7, seen in FIG. 1. At the bottom end of the safety latch 4 is a catch 4c which engages the catch 3c to holds the locking finger 3 when closed and the safety latch 4 has not been depressed (FIG. 1 condition). At the top end is a stopper 4d which rests against the operating lever 5 when the safety latch 4 has travelled its full distance (FIG. 2 condition).

Figure 5:
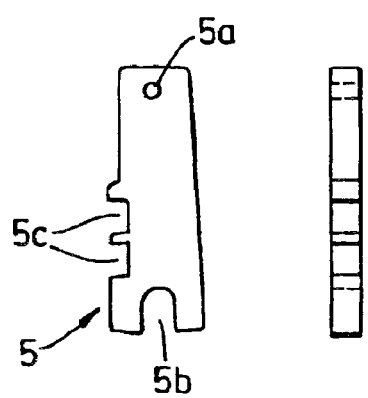

The operating lever 5 is shown in greater detail in FIG. 5. It too is housed inside the hollow centre section of the main member 1. Again the sides of main member 1 are indented at 1b such that part of the lever 5 is clear of the main member 1 housing and can be pushed in by the jaws of an ROV (force B), while being shielded against inadvertent operation. There is a pivot 5a at the top of the lever 5 and a notch 5b at the bottom. This notch 5b acts as a socket for knob 3b at the top of the locking finger 3. The edge of the operating lever 5 inside the main member 1 has two further circular notches 5c which locate the opposite ends of the two springs 7, which thus serve to force the parts 4 and 5 apart, counter to forces A and B as shown.

FIG. 2 shows schematically the device in its open state. In use the jaws of a ROV clasps the device by the exposed parts of the safety latch 4 and operating lever 5 and applies opposite forces (A & B) on the safety latch 4 and operating lever 5, pushing them together and into the main member 1. Resistance is provided by the springs 7 between the safety latch 4 and operating lever 5 such that a substantial force is needed to operate the latches (approximately 100N).

When adequate force is applied the exposed parts of the safety latch 4 and operating lever 5, the safety latch 4, which has less resistance to pressure due to the fact that the distance from its pivot 4a and the midpoint of the two springs 7 is less than half the equivalent distance for the operating lever 5, will rotate around its pivot. The catch 4c at the bottom of this latch 4 will therefore move clear of the catch 3c on the locking finger 3, releasing the locking finger 3. The stopper 4d at the top of this latch 4 will prevent any further travel after release of the locking finger 3.

When the locking finger 3 is freed, the operating lever 5 connected to it is also freed, and now, provided that there is continued adequate pressure applied to both the safety latch 4 and operating lever 5, the operating lever 5 will rotate around its pivot 5a until it rests against the safety latch 4. The knob at the top of locking finger 3b, located inside a socket 5b at the bottom of the operating lever 5 so that as the operating lever 5 rotates around its pivot and forces the knob 3b, and therefore the locking finger 3, to rotate around its own pivot 3a, opening the locking finger 3a.

When the safety latch 4 and operating lever 5 are released, the force imparted by the compressed springs 7 pushes apart the safety latch 4 and operating lever 5, the operating lever 5 will have a greater force imparted on it for the reasons set out above and therefore will return faster. This in turn will force the locking finger 3 to return to its closed position. A moment later the safety latch 4 will return, locking the locking finger 3 into place.

It will be understood that the invention is not limited to the embodiment described above, and the same principles of construction and operation can be applied in a variety of equivalent designs. The number and arrangement of parts can be modified, without departing from the spirit and scope of the invention The device is shown in a vertical orientation and described as having "top" and "bottom" ends, appropriate to a lifting application, but is in no way limited to use in such an orientation. While the force of the springs 7 will return the present device to its closed and locked state regardless of its orientation, other embodiments may rely to a greater or lesser extent on gravity to achieve the same result.

What is claimed is:

1. A coupling device adapted for remote manipulation, the device comprising a main body portion, a hook portion, and at least two movable members, the movable members including a closing member movable relative to the hook portion between open position and closed configurations, and at least one latch member arranged to lock said closing member in the closed configuration, the closed configuration being such that a load cannot escape said hook portion, the latch member and closing member being further arranged such that a gripping action on two opposite sides of said body portion will, as a result of the gripping action on a first of said two opposite sides, automatically release said latch member, and, as a result of the gripping action on a second of said two opposite sides, move said closing member outward, away from said hook portion into the open configuration while the device is held bodily under said gripping action, the closing member and latch member being spring biased so as to close and then lock the device automatically when the grip is released; and wherein the closing member is operated indirectly via an operating member movable under said gripping action.

2. The coupling device as claimed in claim 1 wherein the latch member and closing member are each operated directly under said gripping action.

3. The coupling device as claimed in claim 1 wherein the latch member is operated indirectly via an operating member movable under said gripping action.

4. The coupling device as claimed in claim 1 wherein the closing member takes the form of a lever pivotally connected to said body portion and having a projection upon which the operating member acts to open the device.

5. The coupling device as claimed in claim 4 wherein the closing member is further provided with a stepped cam profile for engaging with the latch member.

6. The coupling device as claimed in claim 1 wherein the or each operating member is pivotally connected to the body portion of the device.

7. The coupling device as claimed in claim 1 wherein the latching member is in the form of a lever.

8. The coupling device as claimed in claim 1 wherein at least one common spring is arranged to act directly or indirectly between the closing member and the latch member, so as to bias both of said parts into their closed and locked positions.

9. The coupling device as claimed in claim 8 wherein said at least one common spring is arranged to act between the operating member and the latch member.

10. The coupling device as claimed in claim 1 wherein the movable members are substantially shrouded within the main body portion of the device so as to prevent accidental release by impact other than said gripping action on said two sides of the body portion.

11. The coupling device as claimed in claim 10 wherein when the device is in its closed and locked configuration the movable members are flush with the extremities of the main body when viewed transversely to the gripping directions.

12. The coupling device as claimed in claim 1 wherein movement of said movable members is limited by stop formations such that at least one of them provides the means of holding the device bodily after the device enters its open configuration.

13. The coupling device as claimed in claim 1 wherein the movable members are arranged to yield until the gripping action is received on the body of the device.

14. The coupling device as claimed in claim 1 wherein the body portion and hook portion are formed of a single piece of metal.

15. The coupling device as claimed in claim 1 wherein the movable members carry none of the load when the coupling device is used.

16. The coupling device as claimed in claim 1 wherein the body portion includes a recess which accommodates the moving members between two walls thereof.

17. A coupling device comprising:

a main body portion;

a hook portion extending from said main body portion;

a closing member attached to said main body portion and movable with respect to said hook portion between an open position and a closed position;

a latch member mounted to said body main portion and having a catch for releasably locking said closing member;

an operating member mounted to said body portion and having means for engaging said closing member; and wherein a gripping action on said latch member and said operating member moves said latch member and said operating member towards one another to unlock said closing member and to move said closing member to the open position, and release of said gripping action causes said latch member and operating member to move away from one another thereby moving said closing member to the closed position and locking said closing member.

* * * * *